(12) United States Patent
Andersson

(10) Patent No.: US 11,758,116 B2
(45) Date of Patent: Sep. 12, 2023

(54) MULTI-VIEW DISPLAY CONTROL

(71) Applicant: Telefonaktiebolaget LM Ericsson (publ), Stockholm (SE)

(72) Inventor: Ola Andersson, Spånga (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 812 days.

(21) Appl. No.: 15/113,369

(22) PCT Filed: Jul. 1, 2014

(86) PCT No.: PCT/EP2014/063966
§ 371 (c)(1),
(2) Date: Jul. 21, 2016

(87) PCT Pub. No.: WO2015/110184
PCT Pub. Date: Jul. 30, 2015

(65) Prior Publication Data
US 2017/0013254 A1    Jan. 12, 2017

(30) Foreign Application Priority Data

Jan. 23, 2014  (WO) .................. PCT/SE2014/050082

(51) Int. Cl.
*H04N 13/156*    (2018.01)
*H04N 13/302*    (2018.01)
(Continued)

(52) U.S. Cl.
CPC ......... *H04N 13/351* (2018.05); *H04N 13/156* (2018.05); *H04N 13/302* (2018.05);
(Continued)

(58) Field of Classification Search
CPC .. H04N 13/351; H04N 13/376; H04N 13/373; H04N 13/156; H04N 13/366; H04N 13/302; H04N 21/4316; H04N 21/44218
See application file for complete search history.

(56) References Cited

U.S. PATENT DOCUMENTS

2007/0177803 A1    8/2007  Elias et al.
2010/0329358 A1*  12/2010  Zhang .................. H04N 19/187
                                                    375/E7.02
(Continued)

FOREIGN PATENT DOCUMENTS

| EP | 2 365 420 A2 | 9/2011 |
|----|---|---|
| EP | 2 385 706 A1 | 11/2011 |
| EP | 2 536 155 A2 | 12/2012 |

OTHER PUBLICATIONS

International Search Report and Written Opinion issued by the ISA in International application No. PCT/EP2014/063966, dated Aug. 22, 2014, 19 pages.

(Continued)

*Primary Examiner* — Anner N Holder
(74) *Attorney, Agent, or Firm* — Rothwell, Figg, Ernst & Manbeck, P.C.

(57) ABSTRACT

A multi-view display controller (100, 200, 300) generates view information specifying view directions along which media data a media content is to be projected on a multi-view display (2) and specifying a selected view direction along which additional information is to be simultaneously projected as media data of the media content. The multi-view display controller (100, 200, 300) thereby enables an intuitive and efficient communication of additional information to the viewer (5) on the multi-view display (2).

16 Claims, 6 Drawing Sheets

(51) Int. Cl.
  *H04N 13/351*   (2018.01)
  *H04N 13/366*   (2018.01)
  *H04N 13/373*   (2018.01)
  *H04N 13/376*   (2018.01)
  *H04N 21/431*   (2011.01)
  *H04N 21/442*   (2011.01)

(52) U.S. Cl.
  CPC ......... *H04N 13/366* (2018.05); *H04N 13/373* (2018.05); *H04N 13/376* (2018.05); *H04N 21/4316* (2013.01); *H04N 21/44218* (2013.01)

(56) References Cited

U.S. PATENT DOCUMENTS

| | | | | |
|---|---|---|---|---|
| 2011/0157264 A1* | 6/2011 | Seshadri | ................... | G06F 3/14 345/698 |
| 2011/0159929 A1 | 6/2011 | Karaoguz et al. | | |
| 2011/0267437 A1* | 11/2011 | Abeloe | ................ | H04N 13/398 348/51 |
| 2011/0304613 A1* | 12/2011 | Thoresson | ........... | H04N 13/376 345/419 |
| 2012/0026157 A1* | 2/2012 | Unkel | ................... | G09G 3/003 345/419 |
| 2012/0026396 A1* | 2/2012 | Banavara | ............. | H04N 13/398 348/500 |
| 2012/0098934 A1* | 4/2012 | McKiel, Jr. | ........ | H04N 13/0007 348/46 |
| 2012/0140048 A1* | 6/2012 | Levine | ............. | H04N 21/21805 348/51 |
| 2012/0200593 A1* | 8/2012 | Todd | ...................... | G09G 3/003 345/619 |
| 2013/0057159 A1* | 3/2013 | Pijlman | ................ | H04N 13/368 315/154 |
| 2014/0091991 A1* | 4/2014 | An | .......................... | G09G 5/14 345/32 |
| 2015/0029317 A1* | 1/2015 | Kim | ..................... | H04N 13/106 348/59 |
| 2016/0150226 A1* | 5/2016 | Song | .................... | H04N 13/376 348/54 |

OTHER PUBLICATIONS

Bost, Callie, "MIT Researcher Says Holographic TV Could Debut in the Next 10 Years," Bloomberg, Jun. 19, 2013, 1 page.

* cited by examiner

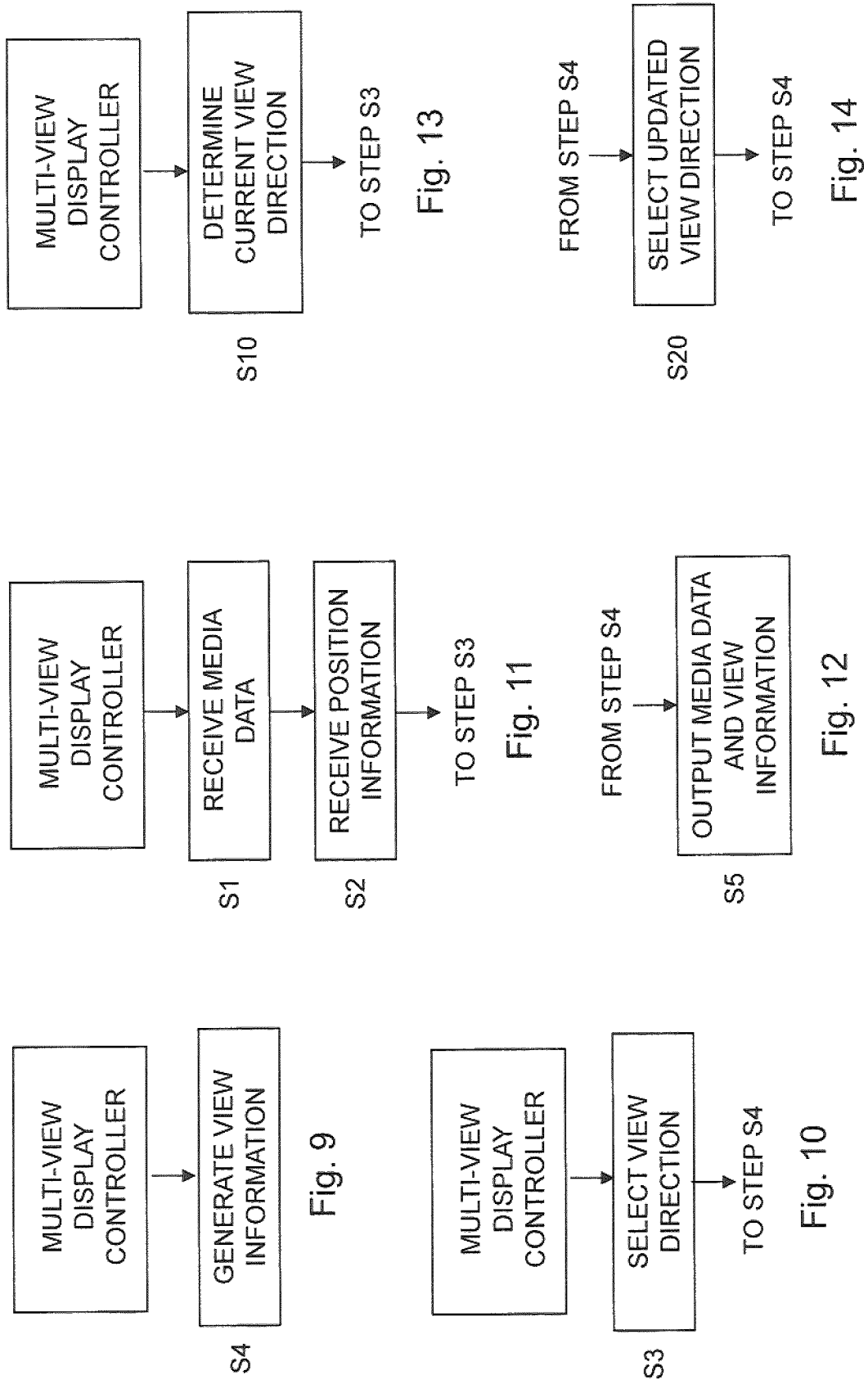

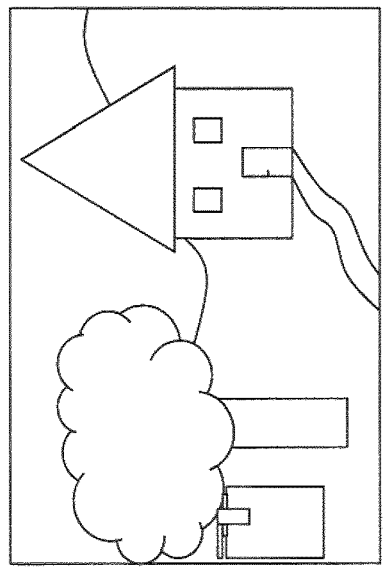
Fig. 17A
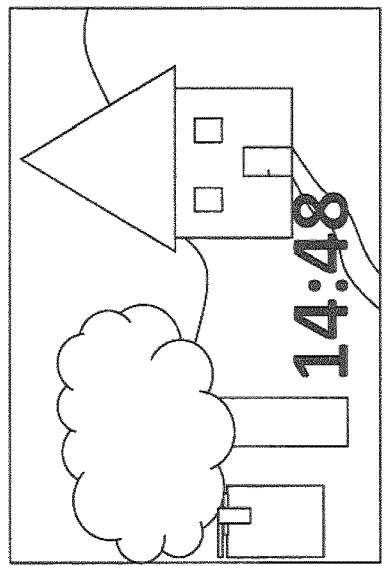
Fig. 17B
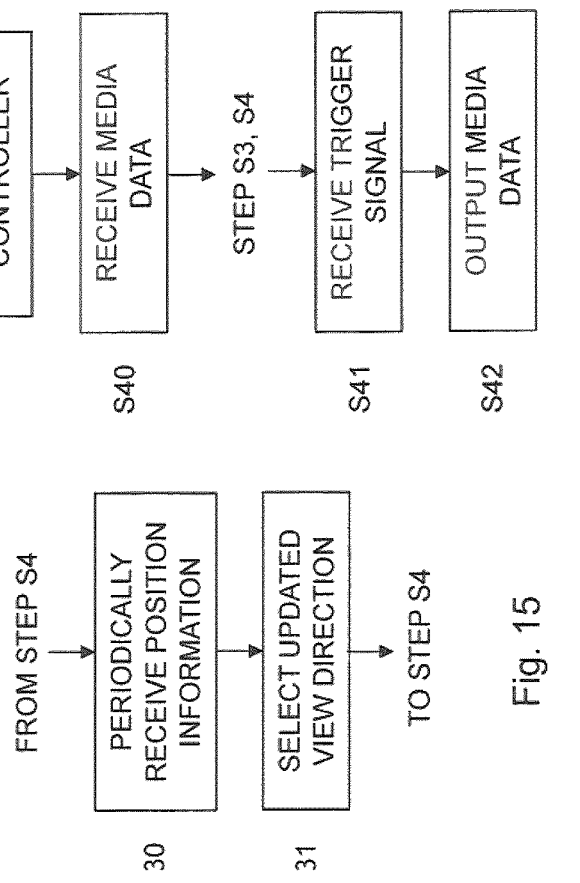
Fig. 16
Fig. 15

MULTI-VIEW DISPLAY CONTROL

CROSS REFERENCE TO RELATED APPLICATION(S)

This application is a 35 U.S.C. § 371 National Phase Entry Application from PCT/EP2014/063966, filed Jul. 1, 2014, which claims priority to International application No. PCT/SE2014/050082, filed Jan. 23, 2014. The above identified applications are incorporated by reference.

TECHNICAL FIELD

The present embodiments generally relate to multi-view display control.

BACKGROUND

3D TV systems that are on the market today are typically stereo-based: one image is presented to the left eye and another to the right eye. There are several ways to achieve this effect. For instance, polarizing filters can be used on every second row of the TV together with polarized glasses. Another way is to quickly alternate the left and the right image on the screen and have the user wear shutter glasses that are synchronized with the screen. Digital cinemas today often use a polarization filter in front of the projector. The filter can change direction every $120^{th}$ of a second, which allows time multiplexing to work together with relatively inexpensive polarized glasses.

However, to some consumers it is undesirable to wear polarized or shutter glasses, and as such, there is a demand for new TV screens that do not require glasses.

A glasses-free 3D display can be achieved by using a lenticular array in front of the screen. This enables some pixels to be visible from only certain angles. A lenticular display can be created by having every second column of pixels visible only to the left eye and the remaining columns only visible to the right eye. However, this requires the viewer to be positioned in a very specific region in front of the display.

Another approach is to use so called multi-view displays. Instead of displaying just two views, these displays can display several views with a small distance in between. Your left eye may see view number 1 and your right eye may see view number 7. By moving slightly to the right, you may instead see view number 2 and view number 8 and this makes it possible to "look around" objects.

US 2011/0164188 relates to a remote control device adapted for use in connection with stereoscopic 3D and multi-view 3D displays. The remote control device is used by a viewer to enable selection of content to be displayed by a display screen. The remote control device is further used to generate location information relating to the position of the eyes of the viewer. A reconfiguration of the screen is then caused based on the location information.

There is room for improvements within the technology of multi-view displays and in particular with regard to conveying information of, for instance, available TV programs to viewers.

SUMMARY

It is a general objective to provide an improved multi-view display control.

It is a particular objective to control display of additional information in an intuitive way to a viewer of a multi-view display.

An aspect of the embodiments relates to a multi-view display controller. The multi-view display controller is configured to generate view information specifying, for at least one pixel area of a multi-view display, view directions of multiple view directions along which media data of a media content is to be projected and specifying, for the at least one pixel area, a selected view direction along which additional information is to be simultaneously projected as media data of the media content.

Another aspect of the embodiments relates to a multi-view display controller comprising a generator for generating view information specifying, for at least one pixel area of a multi-view display, view directions of multiple view directions along which media data of a media content is to be projected and specifying, for the at least one pixel area, a selected view direction along which additional information is to be simultaneously projected as media data of the media content.

A further aspect of the embodiments relates to a multi-view display system comprising a multi-view display controller according to the embodiments and a multi-view display connectable to the multi-view display controller.

Yet another aspect of the embodiments relates to a computer program comprising instructions, which when executed by a processor cause the processor to generate view information specifying, for at least one pixel area of a multi-view display, view directions of multiple view directions along which media data of a media content is to be projected and specifying, for the at least one pixel area, a selected view direction along which additional information is to be simultaneously projected as media data of the media content.

A related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

A further aspect of the embodiments relates to a multi-view display control method comprising generating view information specifying, for at least one pixel area of a multi-view display, view directions of multiple view directions along which media data of a media content is to be projected and specifying, for the at least one pixel area, a selected view direction along which additional information is to be simultaneously projected as media data of the media content.

Optional features of the above mentioned aspects are described in the dependent claims.

The embodiments allow an efficient and intuitive display of additional information to a viewer that is currently watching media content on a multi-view display. This additional information can be accessed by a simple movement of the head of the viewer to access the selected view direction. Hence, no pressing of keys on a remote control is needed to see the additional information.

BRIEF DESCRIPTION OF THE DRAWINGS

The embodiments, together with further objects and advantages thereof, may best be understood by making reference to the following description taken together with the accompanying drawings, in which:

FIG. 9 is a flow chart illustrating a multi-view display control method according to an embodiment;

FIG. 10 is a flow chart illustrating an additional, optional step of the method illustrated in FIG. 9;

FIG. 11 is a flow chart illustrating additional, optional steps of the method illustrated in FIG. 9;

FIG. 12 is a flow chart illustrating an additional, optional step of the method illustrated in FIG. 9;

FIG. 13 is a flow chart illustrating an additional, optional step of the method illustrated in FIG. 9;

FIG. 14 is a flow chart illustrating an additional, optional step of the method illustrated in FIG. 9;

FIG. 15 is a flow chart illustrating additional, optional steps of the method illustrated in FIG. 9;

FIG. 16 is a flow chart illustrating additional, optional steps of the method illustrated in FIGS. 9; and FIGS. 17A and 17B show a schematic illustration of a media content displayed on a multi-view display. FIG. 17A illustrate the concept of displaying media content in some views and FIG. 17B illustrates the concept of displaying media content and additional information represented by current time in other views.

DETAILED DESCRIPTION

Throughout the drawings, the same reference numbers are used for similar or corresponding elements.

The embodiments generally relate to multi-view display control, and in particular to controlling display of media content on a multi-view display. The embodiments enable display of media content on the multi-view display together with additional information to a viewer. Thus, the embodiments provide a solution of how to present additional information, for instance relating to the displayed media content, to a viewer in an intuitive way.

Media content as used herein encompasses any media content or data that can be presented on a multi-view display, such as video content or pictures, regardless of the storage location or the provider of the media content. For instance, the media content could be video content provided by a TV channel provider. Alternatively, the media content could be video data or streams locally stored on a memory of a computer, set-top box, multi-view display system or other entity at the home of the viewer. Hence, also different media content streams, which may originate from different sources, such as recorded by a video camera, downloaded from the Internet, etc., could be regarded as media content according to the embodiments.

In a particular embodiment, the media content is multi-view media content. Hence, the media content, such as video data, comprises data representing different views that can be presented on the multi-view display at different view angles in order to present a true 3D experience to the viewers.

Figure 1:
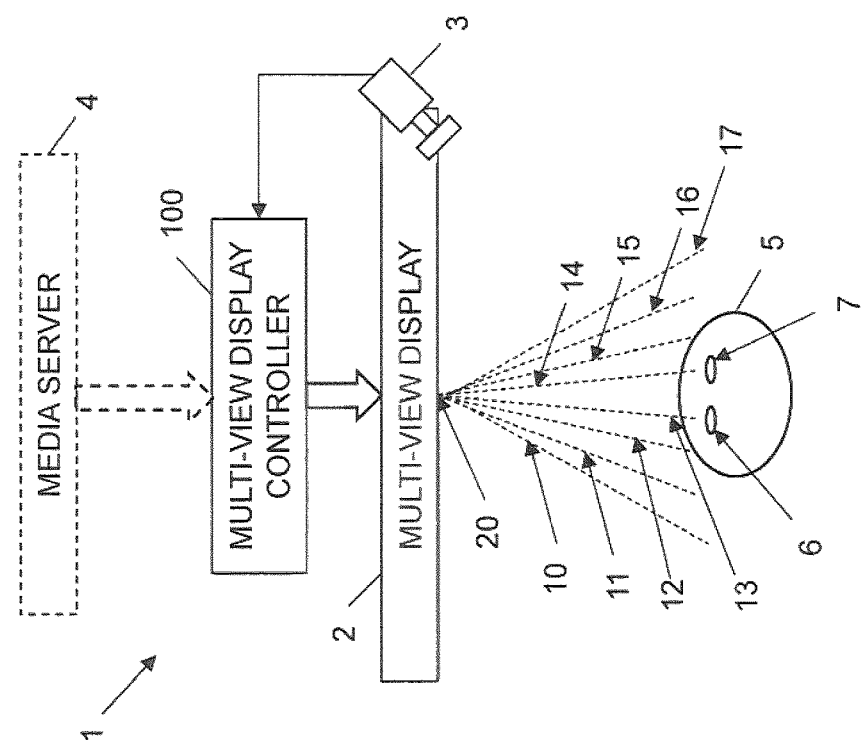
FIG. 1 is a schematic overview of a multi-view display system according to an embodiment showing a viewer watching views conveying media content.

FIG. 1 schematically illustrates a multi-view display system 1 according to an embodiment. The multi-view display system 1 generally comprises a multi-view display controller 100 connectable to a multi-view display 2.

In an optional embodiment, a positioning device 3 is connectable to the multi-view display controller 100 and is operable to generate position information representing a position of a viewer 5 relative to the multi-view display 2.

In an optional embodiment, the multi-view display system 1 also comprises or is at least connectable, wirelessly and/or via a wired connection, to a media content server 4. The media content server 4 is then operable to provide media data of a media content to the multi-view display controller 100. The media content server 4 could be a remote server of a media or TV channel provider or a local TV or media server, e.g. a memory storing different media content streams or data.

Entities of the multi-view display system 1, i.e. the multi-view display 2, and optionally the positioning device 3 and/or the media content server 4, are connectable to the multi-view display controller 100. The connections could be implemented as wireless connections, wired connections or combinations of wired and wireless connections.

An aspect of the embodiment relates to a multi-view display controller 100, such as the multi-view display controller 100 as shown in FIG. 1. The multi-view display controller 100 is configured to generate view information. The view information specifies or defines, for at least one pixel area 20 of a multi-view display 2, view directions 10-17 of multiple view directions 10-17 along which media data of a media content is to be projected. The view information also specifies or defines, for the at least one pixel area 20, a selected view direction 15, 16 along which additional information is to be simultaneously projected as media data of the media content.

Thus, in an embodiment the multi-view display 2 is capable of displaying media data along multiple, i.e. at least two, different view directions, also referred to as view angles in the art, for the given pixel area 20 of the multi-view display 2. FIG. 1 schematically illustrates eight different such view directions. Media data of the current media content is then displayed or projected along at least a portion of these view directions and towards any viewer or viewers 5 positioned to watch the multi-view display 2.

The media data projected along the different view directions 10-17 could be the same media data of the media content. Hence, each view direction 10-17 then projects the same media data. The multi-view display 2 will then operate similar to a traditional 2D TV or display but with the difference that it can display the media data at different view directions or angles instead of at a single view direction for the pixel area.

Alternatively, at least some of the view directions 10-17 could project different view data of the media content to achieve a stereo or indeed a 3D display of the media content. In the case of stereo display, the view directions 10-13 incident on the left eye 6 of the viewer 5 or to the left of the left eye 6 could all project the same media data corresponding to a left view of the media content. Correspondingly, the view directions 14-17 incident on the right eye 7 of the viewer 5 or to the right of the right eye 7 could all project the same data corresponding to a right view of the media content. In this case the view directions 10-13 will project the same media data that is different from the media data that is projected along the view directions 14-17.

For a true 3D experience, the media content could be in the form of multi-view media content with media data representing different views of a scene. In such a case, each view direction 10-17 could project respective media data of a respective view towards the viewer 5. In such a case, the viewer 5 can see around objects in the displayed multi-view media content by slightly moving his/her head relative to the multi-view display 2 to see different view directions 10-17.

Media data of the media content could be projected along all view directions 10-17 available for the at least one pixel area 20. In such a case, the view information may specify all of the multiple view directions 10-17 along which media data is to be projected. In an alternative approach, media data is projected only among a sub-set of the multiple view directions 10-17. For instance, a positioning device 3 could be used to determine the position of the viewer 5 relative to the multi-view display 2. In such a case, it may be sufficient to project media data along the view directions 13, 14 that are accessible to the viewer 5 in the current position in addition to the selected view direction, 16. In FIG. 1, the viewer 5 can see media data of view directions 13, 14 at the current viewing position. This means that no media data needs to be projected along view directions 10-12, 17. In this case, media data is preferably projected along view directions 15, 16, which are the selected view directions in the shown example. If the positioning device 3 is capable of determining the positions of the eyes 6, 7 of the viewer 5 relative to the multi-view display 2 it could be sufficient to only project media data along the view directions 13, 14 incident on the eye positions in addition to the selected view direction 15, 16.

According to the embodiments, the multi-view display 2 not only displays media data of the media content but also displays the additional information. This additional information will be further discussed and defined herein. The additional information is typically not projected along all view directions 10-17 for the pixel area 20 but is rather projected along one view direction 15 or a sub-set 15, 16 of the multiple view directions 10-17. The view direction(s) 15, 16 projecting the additional information also project(s) media data of the media content. Hence, a viewer 5 that is positioned relative to the multi-view display 2 so that the selected view direction(s) 15, 16 incident on one of the eyes 6, 7 will see both the media data projected along the selected view direction(s) 15, 16 and the additional information. Thus, the additional information is simultaneously projected as the media data along the selected view direction(s) 15, 16.

If the viewer 5 moves the head slightly so that he/she no longer sees the selected view direction(s) 15, 16 the viewer 5 will only watch media data and not the additional information. This means that viewers 5 can determine whether to see the additional information or not in addition to the media content simply by moving their head so that the selected view direction(s) 15, 16 incident on one of their eyes 6, 7 or moving the eyes away from the selected view direction(s) 15, 16.

This way of projecting additional information simultaneously as media data of a media content along selected and restricted view direction(s) 15, 16 achieves a much more intuitive way for the viewer 5 to access the additional information compared to prior art solutions typically requiring the viewer 5 to press one or more keys on a remote control to bring up the additional information.

The embodiments described herein give viewers 5 a convenient way to access additional information that otherwise requires use of, for instance, a remote control to access the additional information. Also, the additional information is displayed along a selected view direction(s) 15, 16 to a specific viewer 5 so that other viewers will not be disturbed by the display of the additional information as long as they are not watching the selected view direction 15, 16.

Figure 7:
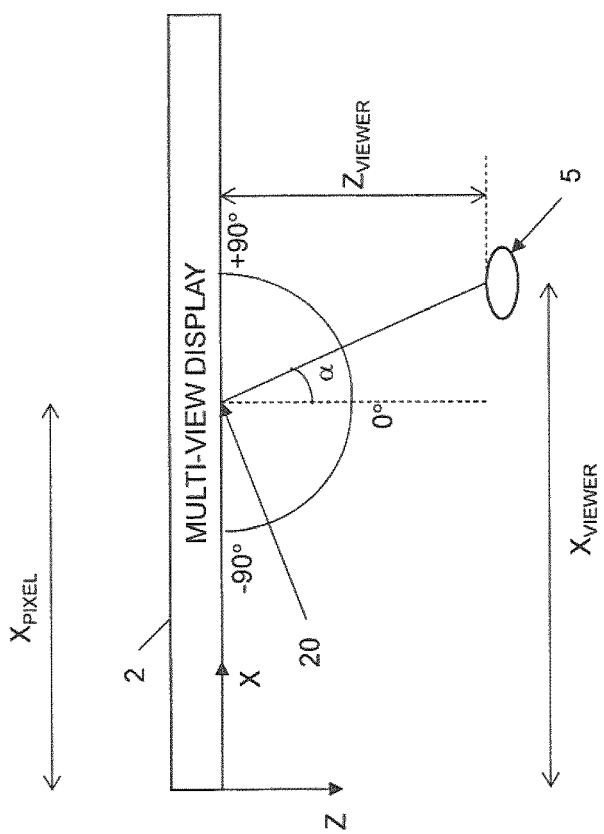
FIG. 7 schematically illustrates an example of calculating view angles.

The selected view direction 15, 16 along which the additional information is to be simultaneously projected as media data of the media content could be a predefined view direction 15, 16. For instance, it could be assumed that most viewers 5 generally sit directly in front of the multi-view display 2 most of the time to watch media data projected along the central view directions 13, 14. In such a case, the selected view direction 15, 16 could be a more peripheral view direction 15, 16. As shown in FIG. 7 a central view direction or angle $\alpha$ could be assumed to be 0°. A peripheral view direction then has an angle $\alpha$ different from 0°. The most peripheral view direction will have an angle close to 90° or −90°. Thus, the selected view direction 15, 16 could be the view direction or directions that fall(s) within a defined range with regard to an angle $\alpha$ relative to the normal of the surface of the multi-view display 2.

In another embodiment, the viewer 5 could select which of the available multiple view directions 10-17 that should be used as the selected view direction 15, 16 along which the additional information is to be simultaneously projected as media data of the media content. This means that the viewer 5 could themselves select the most appropriate view direction 15, 16 based on their preferred viewing position relative to the multi-view display 2.

The multi-view display controller 100 may, in this embodiment, be configured to select the view direction along which the additional information is to be simultaneously projected as media data of the media content based on selection information. The selection information may be generated based on activation of a user input by the viewer 5. The user input is then comprised in the multi-view display controller 100 or is wirelessly connected or connected by wire to the multi-view display controller 100. The user input could be a remote control, mouse, keyboard, smart telephone, computer, laptop, tablet or other user equipment capable of sending the selection information to the multi-view display controller 100. Each view direction 10-17 of the multiple view directions 10-17 could have a respective number, such as 0-7 for the eight view directions 10-17 in FIG. 1. The selection information could then simply define the number of the selected view direction 15, 16 that the viewer 5 would like to use for simultaneous projection of the additional information and media data of the media content.

In another embodiment, the multi-view display controller 100 could select the view direction 15, 16 along which the additional information is to be simultaneously projected as media data of the media content based on information of the current position of the viewer 5.

Hence, the multi-view display controller 100 may be configured to select a view direction 15, 16 among the multiple view directions 10-17 for the at least one pixel area 20. The multi-view display controller 100 performs this selection based on position information representing a position of a viewer 5 relative to the multi-view display 2.

This means that an automatic selection of the most appropriate view direction 15, 16 with regard to the current position of the viewer 5 relative to the multi-view display 2 can be made in this embodiment. The viewer 5 therefore does not need to make any selection and does not need to input any preferred view direction number to the multi-view display controller 100.

The above disclosed embodiments of selecting view direction could be combined. Hence, the multi-view display controller 100 could make an initial selection of view direction 15, 16 based on the position information. The viewer 5 can then manually update or overrule this initial selection by using the user input to generate the selection information. In such a case, the multi-view display controller 100 switches from the initially selected view direction to the view direction defined based on the selection information.

In an embodiment, the multi-view display controller 100 is configured to generate the view information specifying, for the at least one pixel area, a sub-set of the multiple view directions 10-17 along which additional information is to be projected simultaneously as media data of the media content and specifying, for the at least one pixel area, another sub-set of the multiple view directions 10-17 along which media of the media content but no additional information is to be projected.

Thus, in this embodiment the additional information is limited to be projected along a sub-set of the view directions whereas the remaining view directions does not project any additional information but only media data of the media content or no media data at all.

Figure 2:
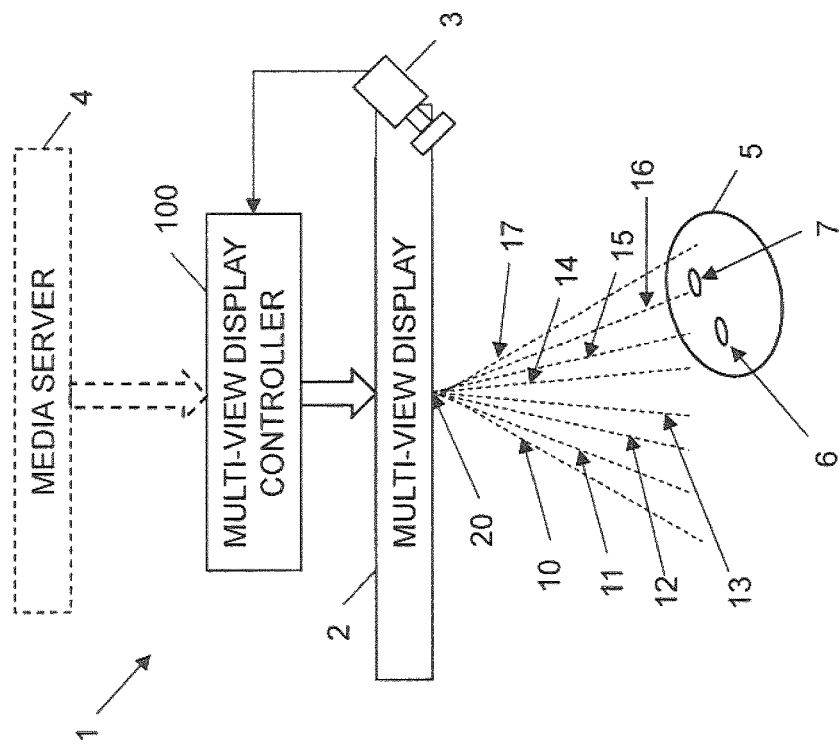
FIG. 2 is a schematic overview of a multi-view display system according to an embodiment showing a viewer watching views conveying media content and additional information.

For instance assume that the selected sub-set corresponds to view directions 15, 16 in FIG. 1. If the viewer 5 is positioned relative to the multi-view display 2 as shown in this figure they will watch media data projected along the view direction 13 with their left eye 6 and watch media data projected along the view direction 14 with their right eye 7. If the viewer 5 move their head slightly to the right as shown in FIG. 2 the eyes 6, 7 will instead be aligned with the view directions 15, 16 that project not only media data of the media content but also the additional information. This means at the position as shown in FIG. 1 the viewer 5 will only watch the media content, whereas in FIG. 2 the viewer 5 has access to the displayed additional information in addition to the media content.

In an embodiment, the multi-view display controller 100 is configured to receive media data of the media content, such as from the media server 4 or indeed from any other media source. The multi-view display controller is preferably also configured to receive the position information from a positioning device 3 as shown in FIGS. 1 and 2.

The position information received from the positioning device 3 represents the current position of the viewer 5 relative to the multi-view display 2. The position information could, for instance, specify the coordinates (X, Z), see FIG. 7, of the viewer 5 in a local coordinate system of the multi-view display system 1. This local coordinate system has an origin at a defined point relative to the multi-view display 2 which may coincide with one of the corners of the multi-view display 2. Alternatively, the position information could define an angle and distance from a pre-defined point in the multi-view display system 1, such as one of the corners of the multi-view display 2, to the viewer 5.

It is generally sufficient according to the embodiments to use position information representing a general position of the viewer 5 or of their head relative to the multi-view display 2. In an alternative embodiment, the position information could give more detailed information, such as the positions of the left eye 6 and the right eye 7 of the viewer 5 relative to the multi-view display 2. Such more detailed position information is in particular suitable with 3DTV where the positions of the viewer's eyes 6, 7 could be tracked in real-time to project media data along view directions towards the eyes 6, 7.

In an embodiment, the positioning device 3 is a camera 3. In such a case, the camera 3 is configured to estimate a respective position of the viewer 5 relative to the multi-view display 2 and determine the position information to represent the estimated respective positions.

Generally, the positioning device 3 of the multi-view display system 1 can be any sensor, camera or other positioning equipment capable of tracking a viewer 5, such as tracking the position of their head or tracking the eyes 6, 7 of a viewer 5, and find the position of the viewer 5, such as of each eye 6, 7 of the viewer 5. The positioning device 3 may track the 3D position of the viewer 5, such as the position of their head or position of each eye 6, 7 of the viewer 5, relative to a fixed or predefined reference point, such as a predefined point of the multi-view display 2.

Finding the 3D position of the viewer 5 or their eye(s) 6, 7 can be done by a sensor, such as the Kinect® sensor used by Xbox® One game console. This sensor creates a high resolution image of the viewer 5 and uses a time-of-flight system to estimate the distance from the sensor in every pixel in the high resolution image. By using face and eye detection the sensor can locate the eyes 6, 7 of the viewer 5 in the high resolution image and by using the time-of-flight data the sensor can calculate how far away the eyes 6, 7 are from the sensor. Hence, the 3D positions of the eyes 6, 7 can be obtained.

There are other sensors and positioning devices available on the market that use similar or different techniques than the Kinect® sensor in order to be able to generate the position information of the present embodiments. For instance, special glasses with infrared (IR) reflecting dots on them could be detected and filmed by IR cameras in order to generate the position information.

In an embodiment, the multi-view display controller 100 is configured to output media data of the media content and the additional information together with the view information to the multi-view display 2 for simultaneous display of the media data of the media content and the additional information. Thus, the multi-view controller 100 outputs the relevant data to be displayed, i.e. the media data and the additional information, together with the view information specifying what type of data that should be projected along the respective view directions 10-17. This means that the multi-view display controller 100 controls how the multi-view display 2 projects or displays data by specifying the view directions 10-14, 17 along which only media data should be projected and specifying the selected view direction(s) 15, 16 along which additional information is to be simultaneously projected as media data.

The multi-view display controller 100 may be configured to generate the view information specifying the view directions 10-17 for the at least one pixel area 20 and specifying the selected view direction 15, 16 along which the additional information is to be projected superimposed on media data of the media content.

FIGS. 16A and 16B schematically illustrates this concept with the additional information exemplified by a clock showing the current time. FIG. 16A illustrates the media data projected along one of the view directions 10-14, 17 that only projects media data. FIG. 16B illustrates the data projected along a selected view direction 15, 16 projecting the additional information superimposed on the media data.

In an embodiment, the multi-view display controller 100 is configured to determine at least one current view direction 13, 14 for the viewer 5 based on the position information. The multi-view display controller 100 may also be configured to select the view direction 15, 16 along which the additional information is to be projected simultaneously as media data of the media content based on information of the at least one current view direction 13, 14.

In this embodiment, the multi-view display controller 100 may use the received position information to determine the current view direction(s) 13, 14 that the viewer 5 currently is watching. The at least one current view direction 13, 14 could represent the view direction(s) 13 incident on the left eye 6 of the viewer 5 and the view direction(s) 14 incident on the right eye 7 of the viewer 5. Alternatively, the at least one current view direction 13, 14 could represent the view direction(s) 13, 14 incident on the head of the viewer 5 or within a defined distance from the position specified by the position information.

The view direction(s) along which the additional information is to be simultaneously projected as media data is(are) then selected based on information of the at least one current view direction. In an embodiment, each view direction could have a respective view number or identifier, such as view number 0-7 for the eight view directions 10-17 shown in FIGS. 1 and 2. The multi-view display controller 100 could then be configured to select the view direction based on the view number(s) or identifier(s) of the at least one current view direction 13, 14 and a defined delta view number or identifier. For instance, if n represents the view number or identifier of a current view direction 13, 14 and d represents the defined delta view number or identifier, then the selected view direction 15, 16 is the view direction having view number or identifier n+d or, in another embodiment, n−d. In FIG. 2 the defined delta view number or identifier is exemplified by d=2 so that the selected view identifiers have view numbers or identifiers 15, 16 if the current view directions have view numbers or identifiers 13, 14.

The value d is preferably predefined and accessible to the multi-view display controller 100.

In an embodiment, the multi-view display controller 100 is configured to select the view direction 15, 16 along which the additional information is to be projected simultaneously as media data of the media content based on the information of the at least one current view direction 13, 14 and the number of the multiple view directions 10-17 for the at least one pixel area 20.

Hence, in this embodiment not only information of the current view direction(s) 13, 14 is used to select the view direction 15, 16 but also the total number of different view directions 10-17. Generally, the higher number of view directions 10-17 the closer the view directions 10-17 are relative to each other, i.e. the angle between two adjacent view directions is smaller when there is more view directions 10-17. This means that a delta view number or identifier that is suitable for a multi-view display 2 having few view directions, i.e. sparse distribution of view directions, may not be suitable for a multi-view display 2 having far more view directions and a dense distribution of view directions. In the latter case, the view directions could be so dense that an eye 6, 7 of a viewer 5 is actually simultaneously seeing more than one view direction. If a low value of the delta view number or identifier is used then it could be possible that the additional information will indeed be projected along one of the view directions that the viewer 5 is watching at the current view position even without any movement of their head or that a very small movement of their head causes the viewer 5 to see the view direction projecting the additional information. In such a case, there could be an annoying switching back and forth between not seeing any additional information and seeing the additional information if the viewer 5 is moving their head even the slightest. Therefore, in one embodiment a larger delta view number or identifier with a denser distribution of view directions is used compared to the case with sparser distribution of view directions.

Thus, in one embodiment the value of the delta view number or direction may be determined by the multi-view display controller 100 based on the number of the multiple view directions for the at least one pixel area. In particular, the delta view number or identifier has a higher value d for a multi-view display 2 with a higher number of view directions 10-17 compared to a multi-view display 2 with a comparatively lower number of view directions 10-17.

In one embodiment, the multi-view display controller 100 is configured to generate the view information specifying, for the at least one pixel area 20, the view directions 10-17, the selected view direction 15, 16 and a time period during which the additional information is to be simultaneously projected as media data of the media content along the selected view direction 15, 16.

Thus, in this embodiment the additional information will only be projected along the selected view direction 15, 16 for limited time period. After the expiry of the time period the multi-view display 2 will only project media data of the media content along the selected view direction 15, 16.

This embodiment is advantageous if the viewer 5 changes viewing position to a new position so that they are positioned to see the selected view direction 15, 16. Unless the viewer 5 shortly changes viewing position again it may be assumed that they have decided to continue watching the media content from the new viewing position. In such a case, the viewer 5 generally does not want to watch the additional information for the whole time. It could therefore be preferred to discontinue with projecting the additional information along the selected view direction 15, 16 following expiry of the time period. In an embodiment, this time period is started upon detection, by the positioning device 3, of a movement of the viewer 5 to the new viewing position.

The length of the time period could be pre-defined and known to the multi-view display controller 100. A same time period could be used regardless of what additional information is being displayed. Alternatively, different additional information could have different associated time periods. For instance, program information giving a presentation of the currently displayed media content may be displayed for a longer time period compared to a comparatively shorter information set, such as a clock showing the current time.

In an alternative embodiment, the multi-view display controller 100 is configured to select an updated view direction among the multiple view directions 10-17 for the at least one pixel area 20 based on updated position information representing an updated position of the viewer 5 relative to the multi-view display 2 following expiry of a time period from detection of the viewer 5 having moved from the (previous) position to the updated position. The multi-view display controller 100 is also configured to generate the view information specifying, for the at least one pixel area 20, the view directions 10-17 and specifying, for the at least one pixel area 20, the selected updated view direction along which the additional information is to be simultaneously projected as media data of the media content.

In this approach, the multi-view display controller 100 updates the selected view direction along which the additional information is to be projected based on the current viewing position of the viewer 5. This means that if the viewer 5 only temporarily moves to a new position but then moves back prior to expiry of the time period then no update of the selected view direction is performed by the multi-view display controller 100. However, if the viewer 5 remains at the updated position even at the expiry of the time period the multi-view display controller 100 may update the selected view direction based on the updated position information, i.e. based on the updated position of the viewer 5.

For instance, assume that a viewer 5 is initially watching media data projected along view direction nos. 3, 4. The multi-view display controller 100 has then selected view direction nos. 3+2=5, 4+2=6 for projection of the additional information. If the viewer 5 then moves to an updated position corresponding to watching media data projected along the view direction nos. 5, 6 the viewer 5 will initially watch both media data and the additional information. If the viewer 5 does not mover further following expiry of the time period the multi-view display controller 100 preferably uses updated position information from the positioning device 3 to determine view direction nos. 5, 6 to be new current view directions for the viewer 5. The updated selected view directions could then be defined based on information of the new current view directions, such as correspond to view direction nos. 5+2=7, 6+2=8.

Thus, in one embodiment, the multi-view display controller 100 may repeat the previously discussed determination of the at least one current view direction and the selection of view direction using the updated position information representing the updated position of the viewer 5 relative to the multi-view display 2.

As mentioned in the foregoing, the length of the time period could be the same regardless of the additional information or the time period could be different for different types of additional information.

In another embodiment, the multi-view display controller 100 is configured to periodically receive, from the positioning device 3, respective position information representing respective positions of the viewer 5 relative to the multi-view display 2 at different time instances. The multi-view display controller 100 is also configured to select an updated view direction among the multiple view directions 10-17 for the at least one pixel area 20 if at least a defined number of the respective position information represents a substantially same updated position of the viewer 5 relative to the multi-view display 2 or fall within predetermined range. The multi-view display controller 100 may also be configured to generate the view information specifying, for the at least one pixel area 20, the view directions 10-17 and specifying, for the at least one pixel area 20, the selected updated view direction along which the additional information is to be simultaneously projected as media data of the media content.

This approach does not use any time period to determine whether an update in selected view direction is to take place. Rather the multi-view display controller 100 periodically, such as every $m^{th}$ second for some defined positive value of m, receives new position information from the positioning device 3. If the viewer 5 has moved to a new viewing position as indicated by a received position information the multi-view display controller 100 may only update the selected view angle if the viewer 5 remains at the new viewing position for at least a period of time corresponding to the time it takes to receive the defined number of position information all representing substantially the same new viewing position or differ from each other with no more than a predetermined range. This means that if the viewer 5 shortly moves backwards or to a further viewing position then not a sufficient number of successive received position information will indicate a same new viewing position and no update of the view direction selection needs to take place.

The actual value of the predefined number of respective position information is preferably dependent on the periodicity of determining the current position of the viewer 5 by the positioning device 3.

In an embodiment, the multi-view display controller 100 is configured to select a first view direction 15 and a second view direction 16 among the multiple view directions 10-17 for the at least one pixel area based on the position information. The multi-view display controller 100 may also be configured to generate the view information specifying, for the at least one pixel area 20, the view directions 10-17. The view information also specifies, for the at least one pixel area 20, the selected first view direction 15 along which first additional information is to be simultaneously projected as media data of the media content. The view information further specifies, for the at least one pixel area 20, the selected second view direction 16 along which second additional information is to be simultaneously projected as media data of the media content.

Thus, in this embodiment different types of additional information can be projected along different selected view directions 15, 16. For instance, if the viewer 5 moves slightly to reach the selected first view direction 15 they could be presented with limited information of the displayed media content, such as title of a movie. However, if the viewer 5 moves further to reach the selected second view direction 16 more information of the movie could be displayed as additional information, such as description of the movie, main actors, etc.

In an embodiment, the selected first and second view directions 15, 16 could both be present in the same direction relative to the current position of the viewer 5, such as both being to the right or to the left of the current position. Alternatively, the viewer 5 could access the first view direction and watch the first additional information by moving their head slightly to the right but access the second view direction and the second additional information by instead moving their head slightly to the left.

For instance, the first additional information could provide information of the media content currently shown on the next higher TV channel, whereas the second additional information could provide information of the media content currently shown on the next lower TV channel.

The additional information could be any type of information that may be useful for display to the viewer in addition to the current media content. Typical examples include, but not limited to, the information and data that is traditionally accessible on TVs by pressing various keys on a remote control. This type of information includes a clock showing the current time, current date, current TV channel, a virtual TV menu containing controls for changing volume and/or channels, etc. Also meta information or data relating to the current media content could be regarded as additional information, such as title of the media content, description of the media content, actors, etc.

The additional information does not necessarily need to be related to traditional TV menu information or information descriptive of the media content. Further examples include social media tools or updates, such as Facebook updates or Twitter flows.

In an embodiment, the multi-view display controller 100 is configured to generate the view information specifying the view directions and the selected view direction along which program information descriptive of the media content is to be simultaneously projected as media data of the media content.

In another embodiment, the multi-view display controller 100 is configured to generate the view information specifying the view directions and the selected view direction along which a virtual TV menu presenting volume and/or channel control options is to be simultaneously projected as media data of the media content.

The virtual TV menu could then display, superimposed on the media content, various controls traditionally found on a remote control, such as buttons for changing volume, changing media or TV channel, accessing a menu, etc.

In a particular embodiment, such a virtual TV menu could be combined with gesture recognition to allow the viewer to move one of their body parts to control the display of the media content, for instance by changing volume or switching channel.

In such an embodiment, the multi-view display controller 100 could be configured to receive media data of the media content and media data of another media content. The multi-view display controller 100 is also configured to receive, from the positioning device 3, a trigger signal generated by the positioning device 3 in response to detection of a predefined movement of at least a part of the viewer 5. The multi-view display controller 100 is further configured to output, in response to the trigger signal, media data of the another media content and the additional information together with the view information to the multi-view display 2 for simultaneous display of the another media content and the additional information.

Hence, the multi-view display controller 100 switches display of the previous media content to new or another media content in response to reception of the trigger signal. The viewer 5 will then instead watch media data of the another media content.

The predefined movement could by any movement of the viewer 5 or a part of the body of the viewer 5, such as raising their hand or arm, moving their head in a defined direction or pattern, blinking of their eye(s) 6, 7 in a defined pattern, etc. When the positioning device 3 detects such a predefined movement it generates and transmits the trigger signal to the multi-view display controller 100.

In an alternative approach, the trigger signal could be generated based upon detection of a predefined voice command from the viewer 5. In such a case, the multi-view display controller 100 may be connected to a sound recording device, such as microphone to detect the voice command and generate the trigger signal.

A channel switching scenario could therefore involve that the viewer 5 first moves their head slightly to watch a virtual TV menu appearing in the selected view direction 15, 16 in addition to the media data. The viewer 5 then moves their hand to a position indicating a channel switching button on the virtual TV menu. The positioning device 3 detects this movement of the arm and generates the trigger signal that is forwarded to the multi-view display controller 100. The multi-view display controller 100 processes the trigger signal and determines that the viewer 5 would like to switch media content to instead watch a new TV channel. The multi-view display controller 100 thereby stops outputting media data of the current TV channel and instead outputs media data of the new TV channel.

The multi-view display controller 100 may continue to output the additional information that will be displayed and superimposed on media data of the new TV channel along the selected view direction.

The multi-view display controller 100 may also switch additional information when switching media content, for instance if the additional information contains title and/or description of the displayed media content. For other types of additional information the multi-view display controller 100 does not necessarily change the additional information in connection with switching media content.

The display of a virtual TV menu as additional information could reduce the need for a remote control in order to switch TV channels and/or adjust the volume.

The pixel area 20 of the multi-view display 2 can be defined according to various embodiments.

In a first embodiment, a pixel area 20 constitutes a column of pixels of the multi-view display 2. The column could be one pixel in width but extend over the whole height of the multi-view display 2. Alternatively, the column could have a width of multiple, i.e. at least two, consecutive pixels while having a height corresponding to the whole height of the multi-view video display 2.

In some multi-view displays 2, the pixel pattern is tilted slightly. This is generally an implementation issue and enables a reduction of the need for pixel density in the X-direction by borrowing from the Y-direction. In such a case, a pixel column could then be a tilted column of pixels that align to the general tilted pixel pattern of the multi-view display 2.

In a second embodiment, a pixel area 20 constitutes a row of pixels of the multi-view display 2. The row could be one pixel in height but extend over the width of the multi-view display 2. Alternatively, the row could have a height of multiple consecutive pixels while having a width corresponding to the whole width of the multi-view video display 2. In another embodiment, the pixel area 20 can be delimited by edges that run vertically and preferably horizontally, i.e. the pixel area 20 does not need to be aligned with the tilted pixel pattern.

In a third embodiment, a pixel area 20 constitutes a block of pixels of the multi-view display 2, such as a block of M×N pixels, wherein M,N are integers larger than or equal to one.

The multi-view display controller 100 may be, in an embodiment, configured to calculate the view directions or angles based on a respective depth of the viewer 5 relative to the multi-view display 2 and based on a respective distance of the viewer 5 in a direction parallel to the direction along a main extension, such as width, of the multi-view display 2 relative to a predefined point on the multi-view display 2, see FIG. 7. In this embodiment, the depths and distances are obtained based on the position information.

FIG. 7 schematically illustrates this depth as Z and the distance parallel to the main extension or horizontal axis as X. In the shown example, the predefined point on the multi-view display 2 is the upper left corner of the multi-view display 2. This should, however, merely be seen as an illustrative but non-limiting example and any corner or indeed any other predefined point of the multi-view display 2 could be used as reference point for defining the distance X and depth Z.

The depths Z and distances X could be determined by the multi-view display controller 100 based on the position information received from the positioning device 3. Alternatively, the position information itself may contain the depth and distance values so that the multi-view display controller 100 simply retrieves them from the received position information.

In particular, the multi-view display controller 100 may use the depth and distance values to calculate the different view directions or angles. FIG. 7 schematically illustrates an example of how a view angle of a pixel area 20 can be calculated using depth and distance values. For instance, tan $$\alpha = \frac{X_{VIEWER} - X_{PIXEL}}{Z_{VIEWER}},$$

wherein α represents the view angle and $Z_{VIEWER}$, $X_{VIEWER}$ and $X_{PIXEL}$ are defined in FIG. 7. This means that the view angle can be obtained as $$\alpha = \arctan\frac{X_{VIEWER} - X_{PIXEL}}{Z_{VIEWER}}.$$

If the pixel area 20 is more than one pixel wide then $X_{PIXEL}$ could represent the X coordinate of the middle of, such as the centroid of, the pixel area.

In the foregoing, the embodiments have mainly been discussed in connection with the viewer 5 moving horizontally or turning their head to watch media data and additional information along the selected view direction. In an alternative embodiment, the view directions can be defined in a vertical plane so that the viewer 5 could instead move their head up or down to access the selected view direction and the additional information.

Figure 8:
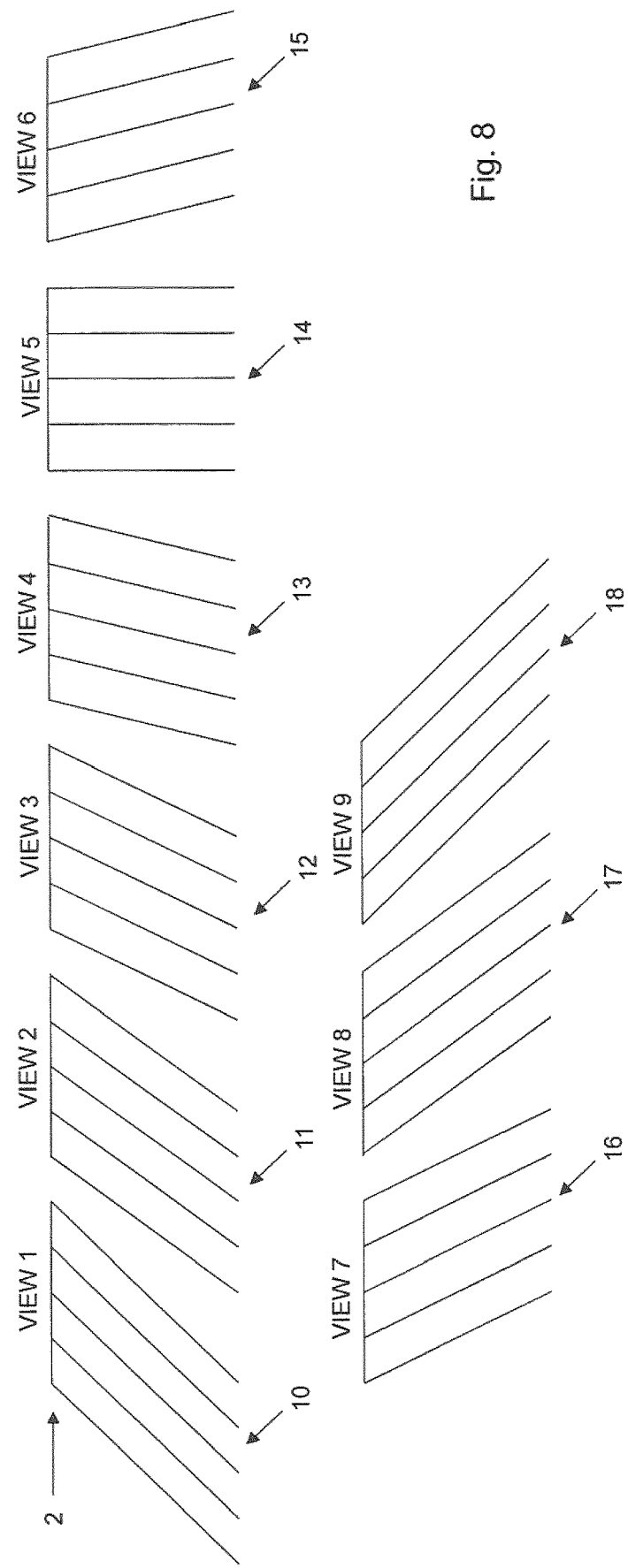
FIG. 8 schematically illustrates projection of different views of media content from pixel areas of a multi-view display according to an embodiment.

FIG. 8 schematically illustrates the concept of projecting media data along different view angles or directions 10-18 from a portion of a multi-view display 2. In this schematic example, the shown portion of the multi-view display 2 has five pixel areas, such as pixel columns, from which media data can be projected at different view directions 10-18. In the illustrated example, each such pixel area is able to project media data along nine different view directions 10-19. Accordingly, nine different views of a multi-view media content can be projected from each pixel area. In the case of 2D media content, the same media data is projected along the nine different views 10-18. At least one of these nine different views 10-18 not only projects media data but also the additional information.

In the foregoing the embodiments have mainly been discussed in connection with a single viewer. The embodiments are, however, not limited thereto. In fact, the multi-view display controller can operate to display additional information to multiple viewers by using respective position information for each viewer in order to select which view direction(s) along which the additional information should be projected simultaneously as media data of the media content.

In a multi-viewer scenario all viewers could be watching the same media content or different viewers could be watching different media content. The additional information projected along the respective selected view direction(s) could be the same for all viewers or different viewers can access different additional information.

Movement of a viewer 5 relative to the multi-view display 2 to see media data and optionally additional information projected along a view direction different from a current view direction could involve the viewer 5 moving to a new viewing position in front of the multi-view display 2. Alternatively, the viewer 5 could move their head slightly while basically remain at the same sitting position with the remainder of their body. A further variant of movement to see a new view direction is to turn the body of the viewer 5 or turn only part of the body, such as the head of the viewer 5.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Figure 4:
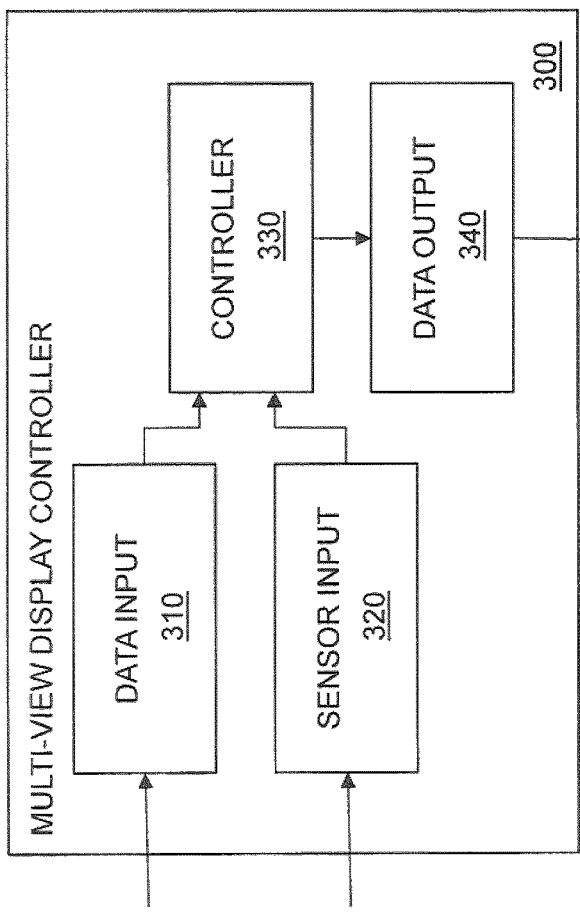
FIG. 4 is a schematic block diagram of a multi-view display controller according to another embodiment.

FIG. 4 illustrates a particular hardware implementation of the multi-view display controller 0. The multi-view display controller 300 comprises, in this embodiment, a data input 310 configured to receive media data of the media content. A sensor input 320 of the multi-view display controller 300 is configured to receive the position information from the positioning device 3. A controller 330 is configured to select the view direction and generate the view information as previously described herein. The multi-view display controller 300 may also comprise a data output 340 configured to output media data and the additional information together with the view information to the multi-view display for simultaneous display of media data of the media content and the additional information.

The data input 310 of the multi-view display controller 300 may be wirelessly connected or connected by wire to the media server to thereby be able to receive media data of the available media contents. The data input 310 is also connected to the controller 330 to forward the media data to the controller 330.

The sensor input 320 is connected to the positioning device and receives the position information therefrom. The sensor input 320 is also connected to the controller 330 to forward the received position information to the controller 330.

The controller 330 is connected to the data output 340 in order to forward the received media data, the additional information and the generated view information to the data output 340. The data output 340 is in turn connected to the multi-view display for forwarding the information thereto.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 3:
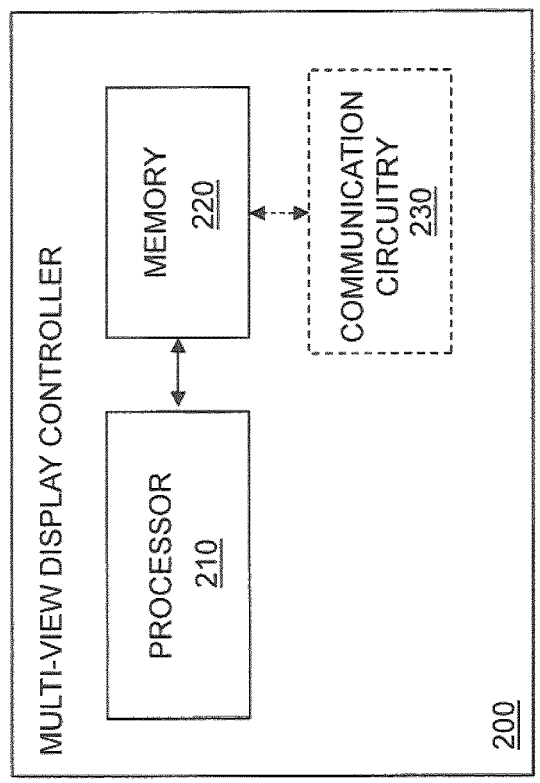
FIG. 3 is a schematic block diagram of a multi-view display controller according to an embodiment.

In a particular example, the multi-view display controller 200 comprises a processor 210 and a memory 220, see FIG. 3. The memory 220 comprises instructions executable by the processor 210, wherein the processor 210 is operative to generate the view information as previously described herein.

In an embodiment, the processor 210 is also operative to select the view direction as previously described herein, such as based on the position information or the selection information.

In an embodiment, the multi-view display controller 200 preferably also comprises a communication circuitry 230 connected to the processor 210 and/or to the memory 220. The communication circuitry 230 is configured to receive media data of the media content. The communication circuitry 230 is also configured to receive the position information from the positioning device and output media data of the media content and the additional information together with the view information to the multi-view display for simultaneous display of media data of the media content and the additional information.

The communication circuitry 230 could be implemented as a receiver and transmitter pair or transceiver, such as for wireless communication with the media server, the positioning device and/or the multi-view display. Alternatively, the communication circuitry 230 could be in the form of an input port and an output port, or a combined input/output (I/O) port, such as for wired communication. It is also possible to have communication circuitry 230 in the form of multiple receiver and transmitter pairs or transceivers, multiple input ports and output ports or I/O ports, or a combination or at least one receiver and transmitter pair or transceiver and at least one input port and output port or I/O port.

Figure 6:
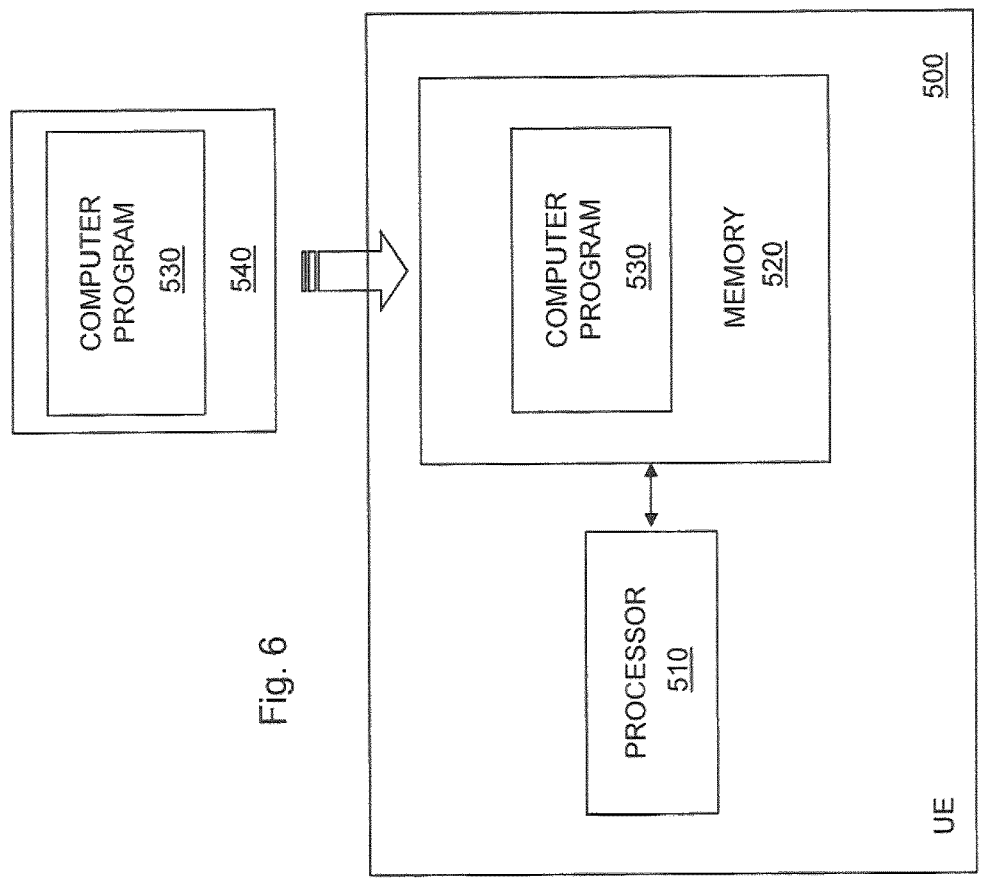
FIG. 6 illustrates a user equipment (UE) according to an embodiment together with a computer program product and computer program according to an embodiment.

FIG. 6 is a schematic block diagram illustrating an example of a user equipment (UE) 500 comprising a processor 510 and an associated memory 520.

In this particular example, at least some of the steps, functions, procedures, modules and/or blocks described herein are implemented in a computer program 530, which is loaded into the memory 520 for execution by processing circuitry including one or more processors 510. The processor 510 and memory 520 are interconnected to each other to enable normal software execution. An optional input/output device may also be interconnected to the processor 510 and/or the memory 520 to enable input and/or output of relevant media data, position information and view information.

The user equipment 500 can be any device or apparatus that can be present in a multi-view display system and connected to a multi-view display. For instance, the user equipment 500 could be a computer, either stationary or portable, such as laptop, a tablet, a set-top box, etc.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, the computer program 530 comprises instructions, which when executed by the processor 510, cause the processor 510 to generate view information specifying, for least one pixel area of a multi-view display, a view direction of multiple view directions along which media data of a media content is to be projected and specifying, for the at least one pixel area, a selected view direction along which additional is to be simultaneously projected as media data of the media content.

In an embodiment, the instructions, which when executed by the processor 510, cause the processor 510 to select a view direction among the multiple view directions for the at least one pixel area of based on position information representing a position of a viewer relative to the multi-view display.

The proposed technology also provides a carrier 540 comprising the computer program 530. The carrier 540 is one of an electronic signal, an optical signal, an electromagnetic signal, a magnetic signal, an electric signal, a radio signal, a microwave signal, or a computer-readable storage medium 540.

By way of example, the software or computer program 530 may be realized as a computer program product, which is normally carried or stored on a computer-readable medium 540, preferably non-volatile computer-readable storage medium 540. The computer-readable medium 540 may include one or more removable or non-removable memory devices including, but not limited to a Read-Only Memory (ROM), a Random Access Memory (RAM), a Compact Disc (CD), a Digital Versatile Disc (DVD), a Blueray disc, a Universal Serial Bus (USB) memory, a Hard Disk Drive (HDD) storage device, a flash memory, a magnetic tape, or any other conventional memory device. The computer program 530 may thus be loaded into the operating memory of a computer or equivalent processing device, represented by the user equipment 500 in FIG. 6, for execution by the processor 510 thereof.

The flow diagram or diagrams presented herein may therefore be regarded as a computer flow diagram or diagrams, when performed by one or more processors. A corresponding multi-view display controller may be defined as a group of function modules, where each step performed by the processor corresponds to a function module. In this case, the function modules are implemented as a computer program running on the processor. Hence, the multi-view display controller may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 5.

Figure 5:
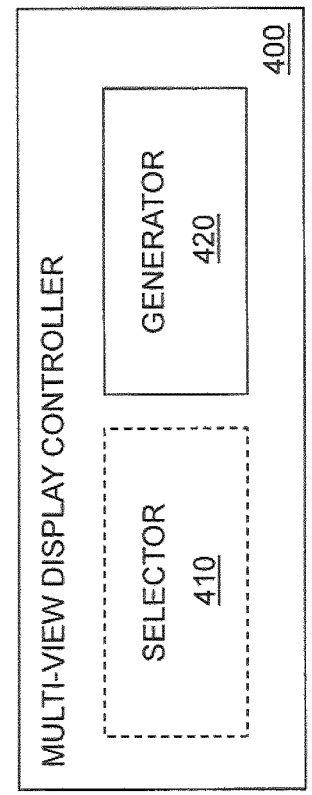
FIG. 5 is a schematic block diagram of a multi-view display controller according to a further embodiment.

FIG. 5 is a schematic block diagram of a multi-view display controller 400 with function modules. The multi-view display controller 400 comprises a generator 420 for generating view information specifying, for least one pixel area of a multi-view display, view direction of multiple view directions along which media data of a media content is to be projected and specifying, for the at least one pixel area, a selected view direction along which additional is to be simultaneously projected as media data of the media content.

In an embodiment, the multi-view display controller 400 also comprises a selector 410 for selecting a view direction among the multiple view directions for the at least one pixel area based on position information representing a position of a viewer relative to the multi-view display.

Both the generator 420 and the selector 410 is in this embodiment enabled by corresponding software executable by one or more processors of the multi-view display controller 400, but they may in other embodiments be implemented as e.g. pure hardware.

The multi-view display controller of the embodiments may be implemented in various ways. For instance, it can be in the form of a set-top box, a module in a TV, a home gateway or server, a computer, etc.

Another aspect of the embodiments relates to a multi-view display system 1, see FIGS. 1-2, comprising the multi-view display controller 100 and the multi-view display 2 connectable to the multi-view display controller 400.

In an embodiment, the multi-view display system 1 also comprises the positioning device 3 configured to generate the position information representing a portion of a viewer 5 relative to the multi-view display 2 and connectable to the multi-view display controller 100.

FIG. 9 is flow chart illustrating a multi-view display control method according to an embodiment. The method comprises generating, in step S4, view information specifying, for at least one pixel area of a multi-view display, view directions of multi-view directions along which media data of a media content is to be projected and specifying, for the at least one pixel area, a selected view direction along which additional information is to be simultaneously projected as media data of the media content.

FIG. 10 is a flow chart illustrating an additional, optional step of the multi-view display control method according to an embodiment. Step S3 comprises selecting a view direction among the multiple view directions for the at least one pixel area based on position information representing a position of a viewer relative to the multi-view display. The method then continues to step S4 of FIG. 9.

FIG. 11 is a flow chart illustrating additional, optional steps of the multi-view display control method according to an embodiment. Media data of the media content is received in step S1. Step S2 comprises receiving the position information from a positioning device. The method then continues to step S3 in FIG. 10, where the position information is used to select the view direction.

Steps S1 and S2 can be performed serially in any order or at least partly in parallel. Generally, step S2 could be performed periodically depending on the frequency at which the positioning device generates new position information. Correspondingly, reception of media data in step S1 could be performed substantially continuously, periodically or at separate time instances.

FIG. 12 is a flow chart illustrating an additional, optional step of the multi-view display control method according to an embodiment. The method continues from step S4 in FIG. 9. In a next step S5 media data of the media content and the additional information are output together with the view information to the multi-view display for simultaneous display of media data of the media content and the additional information.

In an embodiment, step S4 of FIG. 9 comprises generating the view information specifying the view directions for the at least one pixel area and specifying the selected view direction along which the additional information is to be projected superimposed on media data of the media content.

FIG. 13 is a flow chart illustrating an additional, optional step of the multi-view display control method according to an embodiment. Step S10 comprises determining at least one current view direction for the viewer based on the position information. The method then continues to step S3 in FIG. 10. In this embodiment, step S3 preferably comprises selecting the view direction along which the additional information is to be projected simultaneously as media data of the media content based on information of the at least one current view direction.

In a particular embodiment, step S3 preferably comprises selecting the view direction along which the additional information is to be projected simultaneously as media data of the media content based on information of the at least one current view direction and the number of the multiple view directions for the at least one pixel area.

In an embodiment, step S4 of FIG. 9 preferably comprises generating the view information specifying, for the at least one pixel area, the view directions, the selected view direction and a time period during which the additional information is to be simultaneously projected as media data of the media content along the selected view direction.

FIG. 14 is a flow chart illustrating an additional, optional step of multi-view display control method according to an embodiment. The method continues from step S4 in FIG. 9. A next step S20 comprises selecting an updated view direction among the multiple view directions for the at least one pixel area based on updated position information representing an updated position of the viewer relative to the multi-view display following expiry of a time period form detection of the viewer having moved from the position to the updated position. The method then preferably continues to step S4. Step S4 then preferably comprises in this embodiment generating the view information specifying, for the at least one pixel area, the view directions and specifying, for the at least one pixel area, the selected updated view direction along which the additional information is to be simultaneously projected as media data of the media content.

FIG. 15 is a flow chart illustrating additional, optional steps of the multi-view display control method according to an embodiment. The method continues from step S4 in FIG. 9. A next step S30 comprises periodically receiving, from a positioning device, respective position information representing respective positions of the viewer relative to the multi-view display at different time instances. A next step S31 comprises selecting an updated view direction among the multiple view directions for the at least one pixel area if at least a defined number of the respective position information represents a substantially same updated position of the viewer relative to the multi-view display or fall within predetermined range. The method then continues to step S4 in FIG. 9. This step S4 preferably comprises in this embodiment generating the view information specifying, for the at least one pixel area, the view directions and specifying, for the at least one pixel area, the selected updated view direction along which the additional information is to be simultaneously projected as media data of the media content.

In an embodiment, step S3 in FIG. 10 may comprise selecting a first view direction and a second view direction among the multiple view directions for the at least one pixel area based on the position information. Step S4 preferably comprises, in this embodiment, generating the view information specifying, for the at least one pixel area, the view directions and the selected first view direction along which first additional information is to be simultaneously projected as media data of the media content. The view information preferably also specifies, for the at least one pixel area, the selected second view direction along which second additional information is to be simultaneously projected as media data of the media content.

FIG. 16 is a flow chart illustrating additional, optional steps of the multi-view display control method according to an embodiment. Step S40 comprises receiving media data of the media content and media data of another media content. The method then continues to step S3 in FIG. 10 and step S4 in FIG. 9. In such a case, step S4 may comprise generating the view information specifying the view directions and the selected view direction along which a virtual TV menu presenting channel control options is to be simultaneously projected as media data of the media content. The method then continues to step S41, which comprises receiving, from a positioning device, a trigger signal generated by the positioning device in response to detection of a predefined movement of at least a part of the viewer. The method may also comprise outputting, in step S42 and in response to the trigger signal, media data of the another media content and the additional information together with the view information to the multi-view display for simultaneous display of the another media content and the additional information.

The method steps discussed above and shown in FIGS. 9-16 are preferably performed by the previously described multi-view display controller.

The embodiments described above are to be understood as a few illustrative examples of the present technology. It will be understood by those skilled in the art that various modifications, combinations and changes may be made to the embodiments without departing from the scope of the present technology. In particular, different part solutions in the different embodiments can be combined in other configurations, where technically possible.

The invention claimed is:

1. A multi-view display controller, wherein said multi-view display controller is configured to:
control, for at least one pixel area of a multi-view display, the multi-view display to project media data of a media content in a plurality of view directions, the plurality of view directions including a first view direction and a second view direction;
obtain position information representing a current position of a viewer relative to said multi-view display;
determine a set of one or more current view directions for said viewer based on said position information representing the current position of the viewer, said set of current view directions including the first view direction but not the second view direction;
after obtaining the position information, select a set of one or more additional view directions based on the current position of the viewer, wherein the set of additional view directions includes the second view direction and further wherein the display controller is configured to select the set of additional view directions based on the current position of the viewer such that the selected set of additional view directions does not include any view direction that is included in the set of current view directions; and
control the multi-view display to project additional information in each direction included in the set of additional view directions and only in each direction included in the set of additional view directions, wherein
the set of additional view directions is selected such that the viewer must move from the current position to another position in order to view the additional information, the media data of the media content and the additional information are concurrently projected in the second view direction,
the display controller is configured to detect that the viewer has moved to a new position, wherein the new position is aligned with the second view direction,
the display controller is further configured such that, after detecting that the viewer has moved to the new position, the display controller determines whether the viewer has remained in the new position for at least a predetermined duration of time; and
the display controller is further configured to control the multi-view display to cease projecting the additional information in the second view direction with which the new position is aligned as a result of determining that the viewer has remained in the new position for at least the predetermined duration of time.

2. The multi-view display controller of claim 1, wherein the multi-view display controller is configured to obtain information identifying a total number of available view directions along which media data can be projected, and
the multi-view display controller is configured to specify the set of additional view directions based not only on the current position of the viewer but also on the total number of available view directions.

3. The multi-view display controller of claim 1, wherein said multi-view display controller is configured to select an updated view direction among said multiple view directions for said at least one pixel area based on updated position information representing an updated position of said viewer relative to said multi-view display following expiry of a time period from detection of said viewer having moved from said position to said updated position; and
said multi-view display controller is configured to generate said view information specifying, for said at least one pixel area, said view directions and specifying, for said at least one pixel area, said selected updated view direction along which said additional information is to be simultaneously projected as media data of said media content.

4. The multi-view display controller of claim 1, wherein said multi-view display controller is configured to periodically receive, from a positioning device, respective position information representing respective positions of said viewer relative to said multi-view display at respective time instances;
said multi-view display controller is configured to select an updated view direction among said multiple view directions for said at least one pixel area if at least a defined number of said respective position information represents a same updated position of said viewer relative to said multi-view display or fall within predetermined range; and
said multi-view display controller is configured to generate said view information specifying, for said at least one pixel area, said view directions and specifying, for said at least one pixel area, said selected updated view direction along which said additional information is to be simultaneously projected as media data of said media content.

5. The multi-view display controller of claim 1, wherein said multi-view display controller is configured to select a first view direction and a second view direction among said multiple view directions for said at least one pixel area based on said position information; and said multi-view display controller is configured to generate said view information i) specifying, for said at least one pixel area, said view directions, ii) specifying, for said at least one pixel area, said selected first view direction along which first additional information is to be simultaneously projected as media data of said media content, and iii) specifying, for said at least one pixel area, said selected second view direction along which second additional information is to be simultaneously projected as media data of said media content.

6. The multi-view display controller of claim 1, wherein
said multi-view display controller is configured to receive media data of said media content; and
said multi-view display controller is configured to receive said position information from a positioning device.

7. The multi-view display controller of claim 1, wherein said multi-view display controller is configured to output media data of said media content and said additional information together with said view information to said multi-view display for simultaneous display of media data of said media content and said additional information.

8. The multi-view display controller of claim 1, wherein said multi-view display controller is configured to generate said view information specifying said view directions for said at least one pixel area and specifying said selected view direction along which said additional information is to be projected and superimposed on media data of said media content.

9. The multi-view display controller of claim 1, wherein said multi-view display controller is configured to generate said view information specifying, for said at least one pixel area, said view directions, said selected view direction and a time period during which said additional information is to be simultaneously projected as media data of said media content along said selected view direction.

10. The multi-view display controller of claim 1, wherein said multi-view display controller is configured to generate said view information specifying said view directions and said selected view direction along which program information descriptive of said media content is to be simultaneously projected as media data of said media content.

11. The multi-view display controller of claim 1, comprising:
a processor; and
a memory comprising instructions executable by said processor, wherein said processor is configured to generate said view information.

12. A multi-view display method, comprising:
controlling, for at least one pixel area of a multi-view display, the multi-view display to project media data of a media content in a plurality of view directions, the plurality of view directions including a first view direction and a second view direction;
obtaining position information representing a current position of a viewer relative to said multi-view display;
determining a set of one or more current view directions for said viewer based on said position information representing the current position of the viewer, said set of current view directions including the first view direction but not the second view direction;
after obtaining the position information, selecting a set of one or more additional view directions based on the current position of the viewer, wherein the set of additional view directions includes the second view direction and further wherein the display controller is configured to select the set of additional view directions based on the current position of the viewer such that the selected set of additional view directions does not include any view direction that is included in the set of current view directions; and
controlling the multi-view display to project additional information in each direction included in the set of additional view directions and only in each direction included in the set of additional view directions, wherein
the set of additional view directions is selected such that the viewer must move from the current position to another position in order to view the additional information,
the media data of the media content and the additional information are concurrently projected in the second view direction, and
the method further comprises:
detecting that the viewer has moved to a new position that is aligned with the second view direction,
after detecting that the viewer has moved to the new position, determining whether the viewer has remained in the new position for at least a predetermined duration of time; and
controlling the multi-view display to cease projecting the additional information in the second view direction as a result of determining that the viewer has remained in the new position for at least the predetermined duration of time.

13. A multi-view display system comprising:
a multi-view display controller of claim 1; and
a multi-view display connectable to said multi-view display controller.

14. A computer program product comprising a non-transitory computer readable medium storing instructions, which when executed by a processor, cause said processor to:
control, for at least one pixel area of a multi-view display, the multi-view display to project media data of a media content in a plurality of view directions, the plurality of view directions including a first view direction and a second view direction;
obtain position information representing a current position of a viewer relative to said multi-view display;
determine a set of one or more current view directions for said viewer based on said position information representing the current position of the viewer, said set of current view directions including the first view direction but not the second view direction;
after obtaining the position information, select a set of one or more additional view directions based on the current position of the viewer, wherein the set of additional view directions includes the second view direction and further wherein the display controller is configured to select the set of additional view directions based on the current position of the viewer such that the selected set of additional view directions does not include any view direction that is included in the set of current view directions; and
control the multi-view display to project additional information in each direction included in the set of additional view directions and only in each direction included in the set of additional view directions, wherein
the set of additional view directions is selected such that the viewer must move from the current position to another position in order to view the additional information, the media data of the media content and the additional information are concurrently projected in the second view direction, and said instructions, when executed by said processor, further cause said processor to:
- detect that the viewer has moved to a new position that is aligned with the second view direction,
- after detecting that the viewer has moved to the new position, determine whether the viewer has remained in the new position for at least a predetermined duration of time; and
- control the multi-view display to cease projecting the additional information in the second view direction as a result of determining that the viewer has remained in the new position for at least the predetermined duration of time.

15. The multi-view display controller of claim 1, wherein the position information comprises a position of a right eye of the viewer and a position of the left eye of the viewer.

16. The multi-view display controller of claim 15, wherein the set of additional view directions further includes i) a direction accessible by the right eye of the viewer but not the left eye of the viewer and ii) a direction accessible by the left eye of the viewer but not the right eye of the viewer.

* * * * *